United States Patent
Li (10) Patent No.: US 11,545,837 B2
(45) Date of Patent: Jan. 3, 2023

(54) WIRELESS HANDHELD DEVICE

(71) Applicant: Ningbo Haojia Electrical Appliances Co., Ltd., Zhejiang (CN)

(72) Inventor: Yongbo Li, Zhejiang (CN)

(73) Assignee: Ningbo Haojia Electrical Appliances Co., Ltd., Zhejiang (CN)

( * ) Notice: Subject to any disclaimer, the term of this patent is extended or adjusted under 35 U.S.C. 154(b) by 536 days.

(21) Appl. No.: 16/668,270

(22) Filed: Oct. 30, 2019

(65) Prior Publication Data
US 2020/0266646 A1 Aug. 20, 2020

(30) Foreign Application Priority Data
Feb. 19, 2019 (CN) .......................... 201920210297.2
Feb. 19, 2019 (CN) .......................... 201920217977.7
(Continued)

(51) Int. Cl.
*H01M 10/46* (2006.01)
*H02J 7/00* (2006.01)
(Continued)

(52) U.S. Cl.
CPC ................ *H02J 7/00* (2013.01); *A46B 13/02* (2013.01); *D06F 75/08* (2013.01); *D06F 75/34* (2013.01);
(Continued)

(58) Field of Classification Search
CPC . A46B 13/02; A46B 2200/104; D06F 58/203; D06F 75/08; D06F 75/34;
(Continued)

(56) References Cited

U.S. PATENT DOCUMENTS 974,137 A * 11/1910 Haring
2006/0032076 A1 * 2/2006 Evanyk ................. D06F 79/026
34/96

(Continued)

FOREIGN PATENT DOCUMENTS

CN 109162077 1/2018
CN 108708154 10/2018
(Continued)

*Primary Examiner* — Victoria H Lynch
(74) *Attorney, Agent, or Firm* — Terry M. Sanks, Esq.; Beusse Sanks, PLLC (57) ABSTRACT

The present invention discloses wireless handheld device. The wireless handheld device comprises a device structure and a handle, wherein the device structure is detachably connected to the handle by a magnetic type structure or a clamping type structure; a lithium battery is disposed in the handle; a driving mechanism is disposed in the device structure; wherein the magnetic type structure comprises a slot and a connector, the slot is arranged on a lower surface of the handle and the connector is arranged on an upper surface of the device structure, wherein, a first magnetic structure is disposed in the slot and a second magnetic structure is disposed in the connector; wherein the clamping type structure comprises a slot and a connector, the slot is arranged on a lower surface of the handle and the connector is arranged on an upper surface of the device structure, wherein a lower end of the slot extends inward to form a first clamping block, an upper end of the connector extends outward to form a second clamping block, and the slot and the connector are rotated and connected by the first clamping block and the second clamping block. The present invention has the advantages of small volume, light weight, so that it is easy to carry and occupies less space for storage, making it possible to make the handheld device act as a wireless device.

10 Claims, 11 Drawing Sheets

(30) Foreign Application Priority Data

| Jun. 13, 2019 | (CN) | .......................... 201910512683.1 |
| Jun. 13, 2019 | (CN) | .......................... 201910512685.0 |
| Jun. 13, 2019 | (CN) | .......................... 201920888534.0 |
| Jun. 13, 2019 | (CN) | .......................... 201920888552.9 |

(51) Int. Cl.
  *A46B 13/02* (2006.01)
  *D06F 75/08* (2006.01)
  *D06F 75/34* (2006.01)
  *H01M 10/052* (2010.01)

(52) U.S. Cl.
  CPC ......... *H01M 10/052* (2013.01); *H01M 10/46* (2013.01); *A46B 2200/104* (2013.01); *H01M 2220/30* (2013.01)

(58) Field of Classification Search
  CPC ............... H01M 10/052; H01M 10/46; H01M 2220/30; H02J 7/00; Y02E 60/10
  See application file for complete search history.

(56) References Cited

U.S. PATENT DOCUMENTS

2008/0168687 A1* 7/2008 Pan .......................... D06F 75/38
 38/69
2021/0120632 A1* 4/2021 Koh ......................... A61L 9/014

FOREIGN PATENT DOCUMENTS

| CN | 108914520 | 11/2018 | |
| GB | 2422047 A | * 7/2006 | .......... H01M 2/1016 |

\* cited by examiner

WIRELESS HANDHELD DEVICE

BACKGROUND OF THE INVENTION

1. Field of the Invention

The invention relates to the field of household appliances, and more particularly, to a wireless handheld device.

2. Description of the Related Art

Conventional household products, handheld electric devices such as electric irons, lint ball trimmers and hairbrushes, etc., are usually larger in size, heavy in weight, and inconvenient to use and carry. And the handheld electric devices are powered by trailing cables, so that consumers' need for wirelessly using the handheld electric devices may not be met. In addition, in the handheld electric devices, a heating structure of the electric iron is heated by an electric heating tube, in which the electric heating tube needs to be pre-cast into an evaporator by die-casting technique. Such a complicated process is inconvenient to implement, and the scrap rate is high. Moreover, there are difficulties in producing a type of electric heating tube which is operated by using low-voltage direct current, owing to the fact that materials for producing such electric heating tubes are limited, generating a limitation on making the wireless handheld electric iron. Furthermore, a handle of the handheld electric device is often fixedly connected to its heating structure, that is, it is undetachable. Therefore, it is difficult to be carried and stored by a user. The handle is usually carried with a trailing cable; thus it is necessary to insert the plug into a socket for operation. It should be understood that the trailing cable makes its deployment defined within a limited distance and application scenarios.

On the other hand, conventional household products, such as electric irons, lint ball trimmers and hairbrushes, etc., implement only one function, so it is impossible to transfer from one device to another to implement different functions. Thus, users have to purpose a various products for meet their demand for different functions.

SUMMARY OF THE INVENTION

Given that the foregoing problems exist in the prior art, the present invention provides an integrated wireless handheld device.

To that end, the present invention adopts the following technical solutions:

A wireless handheld device, comprising: a device structure and a handle, the device structure being detachably connected to the handle by a magnetic type structure, a lithium battery being disposed in the handle, a driving mechanism being disposed in the device structure; wherein the magnetic type structure comprises a slot and a connector, the slot is fitted with the connector, the slot is arranged on a lower surface of the handle, the connector is arranged on an upper surface of the device structure, wherein, a first magnetic structure is disposed in the slot, a second magnetic structure is disposed in the connector, and the first magnetic structure matches with the second magnetic structure; the magnetic type structure further comprises a plurality of first contacts and a plurality of second contacts, wherein each of the plurality of first contacts matches with each of the plurality of second contacts, the plurality of first contacts are electrically connected to the driving mechanism and the plurality of second contacts are electrically connected to the lithium battery, and each of the plurality of first contacts is detachably electrically connected to each of the plurality of second contacts.

In the above-mentioned wireless handheld device, wherein the device structure is an electric iron, and the driving mechanism is a heating structure; wherein the heating structure comprises, as fixably disposed parts in a sequence from top to bottom: a top cover, a middle cover, a pressing plate, a ceramic heating piece, and a bottom plate, wherein the top cover is of a conical shape; an upper end of the top cover extends upward to form the connector; a periphery of the pressing plate is fixedly connected to the bottom plate; a lower surface of the pressing plate rests against the ceramic heating piece; and a lower surface of the ceramic heating piece rests against the bottom plate.

In the above-mentioned wireless handheld device, wherein the bottom plate is provided with a bottom plate groove, and both the ceramic heating piece and the pressing plate are disposed in the bottom plate groove.

In the above-mentioned wireless handheld device, wherein an upper surface of the middle cover is further provided with a plurality of fins, and the plurality of fins are arranged in a circumferential array.

In the above-mentioned wireless handheld device, wherein the device structure is an electric lint ball trimmer or an electric hairbrush.

In the above-mentioned wireless handheld device, wherein the handle comprises an upper shell and a lower shell, wherein the upper shell is fixedly connected to the lower shell; an electronic board is arranged inside the upper shell and the lower shell; the plurality of second contacts, a display screen and the lithium battery are disposed on the electronic board; one side of a lower surface of the lower shell is provided with a slot in which the plurality of second contacts are located.

In the above-mentioned wireless handheld device, wherein the electronic board is further provided with a charging interface and a USB output interface.

In the above-mentioned wireless handheld device, wherein side walls of the slot have a plurality of positioning ribs, side surfaces of the connector have a plurality of positioning grooves, and each of the positioning ribs is fitted with each of the positioning grooves.

In the above-mentioned wireless handheld device, wherein the plurality of positioning grooves extend from an upper end of the connector to a middle portion of the connector.

The above-mentioned wireless handheld device further comprises: a bottom plate sleeve having a teardrop shape fitted to the shape of the bottom plate.

Another wireless handheld device, comprising: a device structure and a handle, the device structure being detachably connected to the handle by a clamping type structure, a lithium battery being disposed in the handle, a driving mechanism being disposed in the device structure; wherein the clamping type structure comprises a slot and a connector, the slot is fitted with the connector, the slot is arranged on a lower surface of the handle, the connector is arranged on an upper surface of the device structure, wherein a lower end of the slot extends inward to form a first clamping block, an upper end of the connector extends outward to form a second clamping block, the slot and the connector are rotated and connected by the first clamping block and the second clamping block; the clamping type structure further comprises a plurality of first contacts and a plurality of second contacts, wherein each of the plurality of first contacts matches with each of the plurality of second contacts, the plurality of first contacts are electrically connected to the driving mechanism and the plurality of second contacts are electrically connected to the lithium battery, and each of the plurality of first contacts is detachably electrically connected to each of the plurality of second contacts.

In the above-mentioned another wireless handheld device, wherein the device structure is an electric iron, and the driving mechanism is a heating structure; wherein the heating structure comprises, as fixably disposed parts in a sequence from top to bottom: a top cover, a middle cover, a pressing plate, a ceramic heating piece, and a bottom plate, wherein the top cover is of a conical shape; an upper end of the top cover extends upward to form the connector; a periphery of the pressing plate is fixedly connected to the bottom plate; a lower surface of the pressing plate rests against the ceramic heating piece; and a lower surface of the ceramic heating piece rests against the bottom plate.

In the above-mentioned another wireless handheld device, wherein the bottom plate is provided with a bottom plate groove, and both the ceramic heating piece and the pressing plate are disposed in the bottom plate groove.

In the above-mentioned another wireless handheld device, wherein an upper surface of the middle cover is further provided with a plurality of fins, and the plurality of fins are arranged in a circumferential array.

In the above-mentioned another wireless handheld device, wherein the device structure is an electric lint ball trimmer or an electric hairbrush.

In the above-mentioned another wireless handheld device, wherein the handle comprises an upper shell and a lower shell, wherein the upper shell is fixedly connected to the lower shell; an electronic board is arranged inside the upper shell and the lower shell; the plurality of second contacts, a display screen and the lithium battery are disposed on the electronic board; one side of a lower surface of the lower shell is provided with a slot in which the plurality of second contacts are located.

In the above-mentioned another wireless handheld device, wherein the electronic board is further provided with a charging interface and a USB output interface.

The above-mentioned wireless handheld device further comprises: a bottom plate sleeve having a teardrop shape fitted to the shape of the bottom plate.

By adopting the above-mentioned technical solutions, the present invention has the following advantageous effects as compared to the prior art.

The present invention has the advantages of small volume, light weight, so that it is easy to carry and occupies less space for storage, making it possible to make the handheld device act as a wireless device.

In the present invention, different functions may be obtained by switching from one device structure to another device structure in a quick and convenient manner; and the handle may serve as a power bank (i.e., a portable charger) when the device structure is not operated.

BRIEF DESCRIPTION OF THE DRAWINGS

The accompanying drawings, together with the specification, illustrate exemplary embodiments of the present disclosure, and, together with the description, serve to explain the principles of the present invention.

In the drawings: 1. Device structure, 11. Connector, 111. Positioning groove, 12. Second magnetic structure, 13. First contact, 2. Handle, 21. Slot, 211. Positioning rib, 22. First magnetic structure, 23. Second contact, 30. Top cover, 31. Middle cover, 311. Fin, 32. Pressing plate, 33. Ceramic heating piece, 34. Bottom plate, 40. Upper shell, 41. Lower shell, 42. Electronic board, 43. Display screen, 44. Charging interface, 45. USB output interface; 5. Bottom plate sleeve, 6. Slot, 61. First clamping block, 7. Connector, 71. Second clamping block.

DETAILED DESCRIPTION

The present invention will now be described more fully hereinafter with reference to the accompanying drawings, in which exemplary embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" or "has" and/or "having" when used herein, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "around", "about" or "approximately" shall generally mean within 20 percent, preferably within 10 percent, and more preferably within 5 percent of a given value or range. Numerical quantities given herein are approximate, meaning that the term "around", "about" or "approximately" can be inferred if not expressly stated.

As used herein, the term "plurality" means a number greater than one.

Hereinafter, certain exemplary embodiments according to the present disclosure will be described with reference to the accompanying drawings.

Example 1

Figure 1:
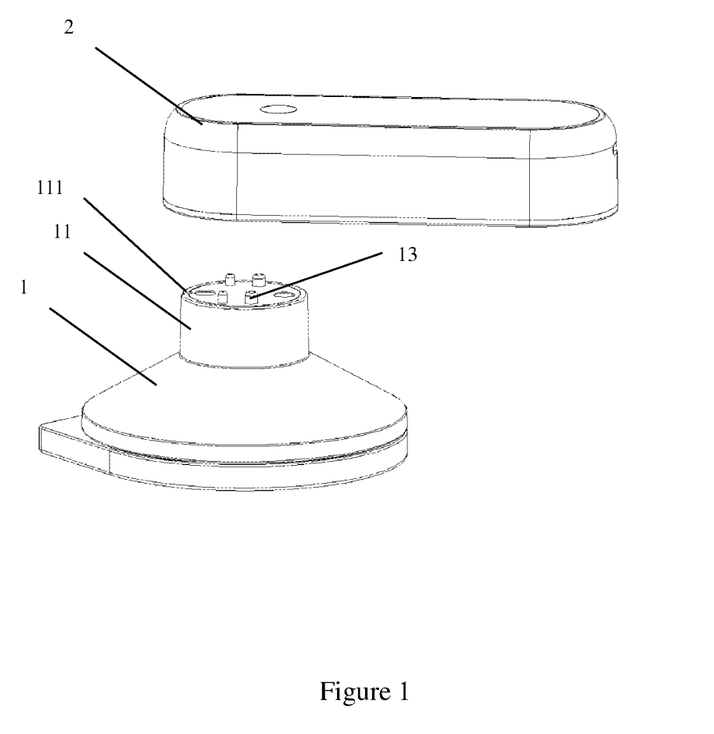
FIG. 1 is a schematic view showing a wireless handheld device according to a first embodiment of the present invention.

FIG. 1 is a schematic view showing a wireless handheld device according to a first embodiment of the present invention.

Figure 2:
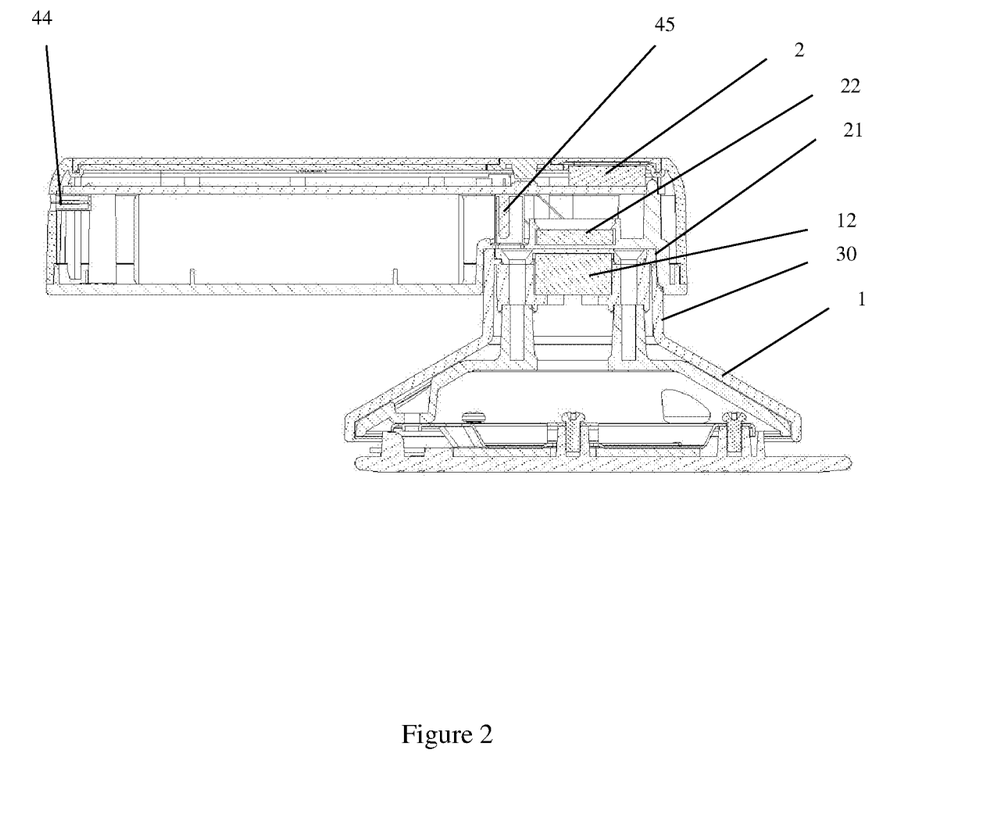
FIG. 2 is a sectional view showing the wireless handheld device according to the first embodiment of the present invention.

FIG. 2 is a sectional view showing the wireless handheld device according to the first embodiment of the present invention.

Figure 3:
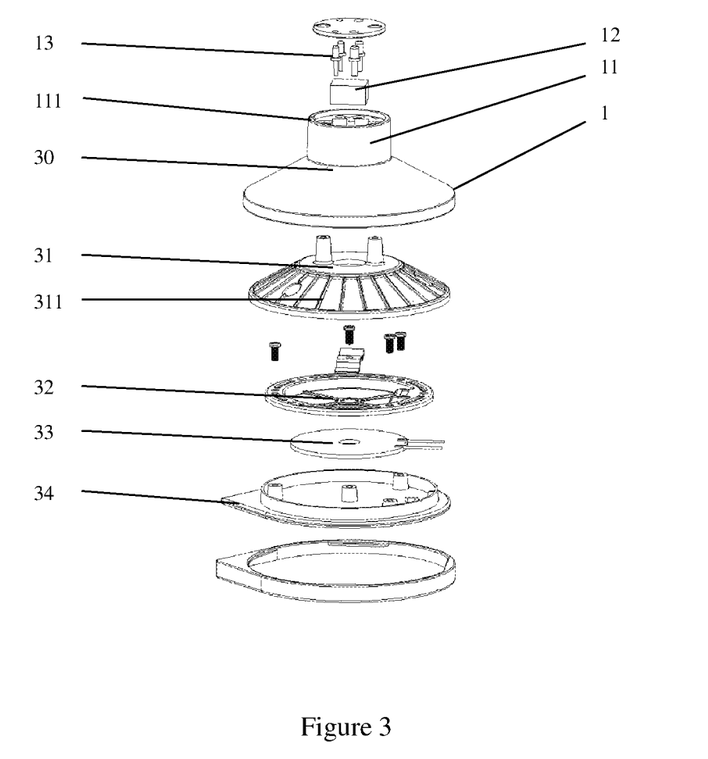
FIG. 3 is an exploded view showing a device structure of the wireless handheld device according to the first embodiment of the present invention.

FIG. 3 is an exploded view showing a device structure of the wireless handheld device according to the first embodiment of the present invention.

Figure 4:
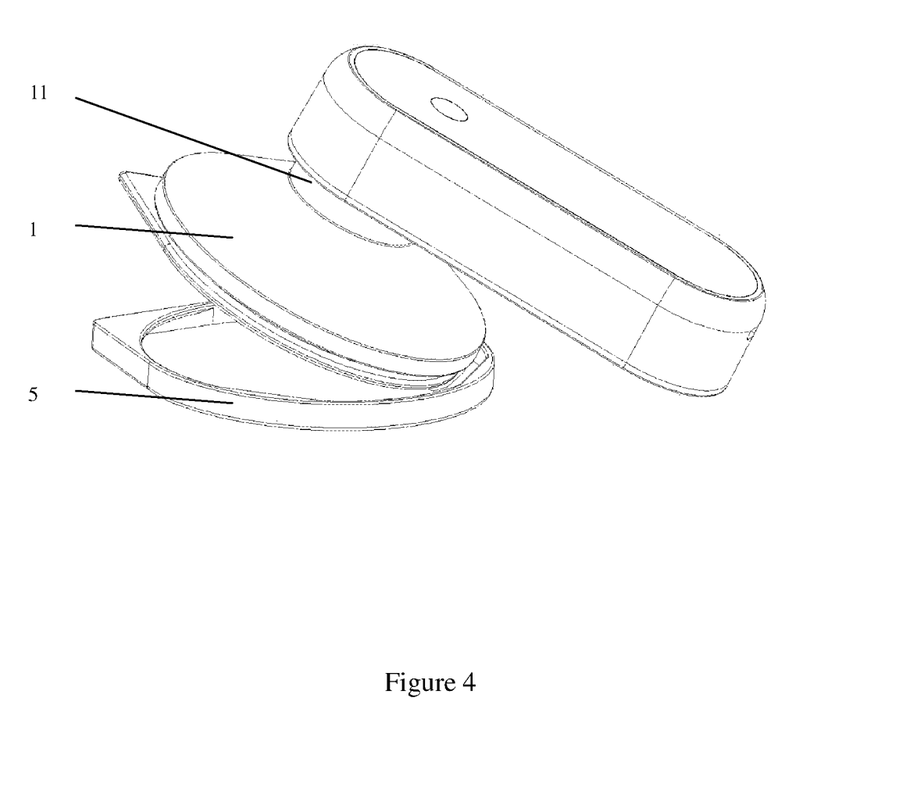
FIG. 4 is a schematic view showing the wireless handheld device according to the first embodiment of the present invention.

FIG. 4 is a schematic view showing the wireless handheld device according to the first embodiment of the present invention.

Figure 5:
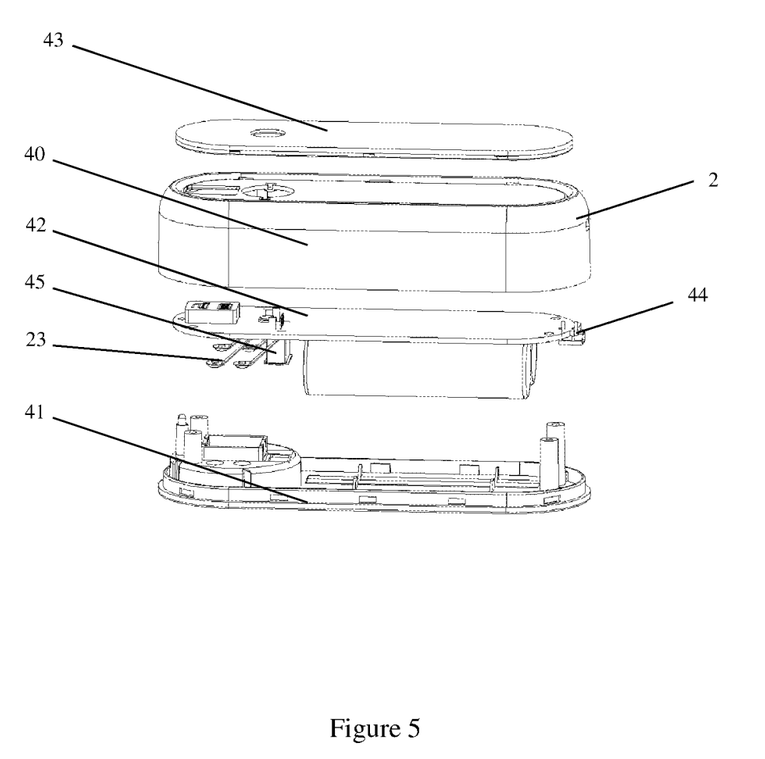
FIG. 5 is an exploded view showing a handle of the wireless handheld device according to the first embodiment of the present invention.

FIG. 5 is an exploded view showing a handle of the wireless handheld device according to the first embodiment of the present invention.

Figure 6:
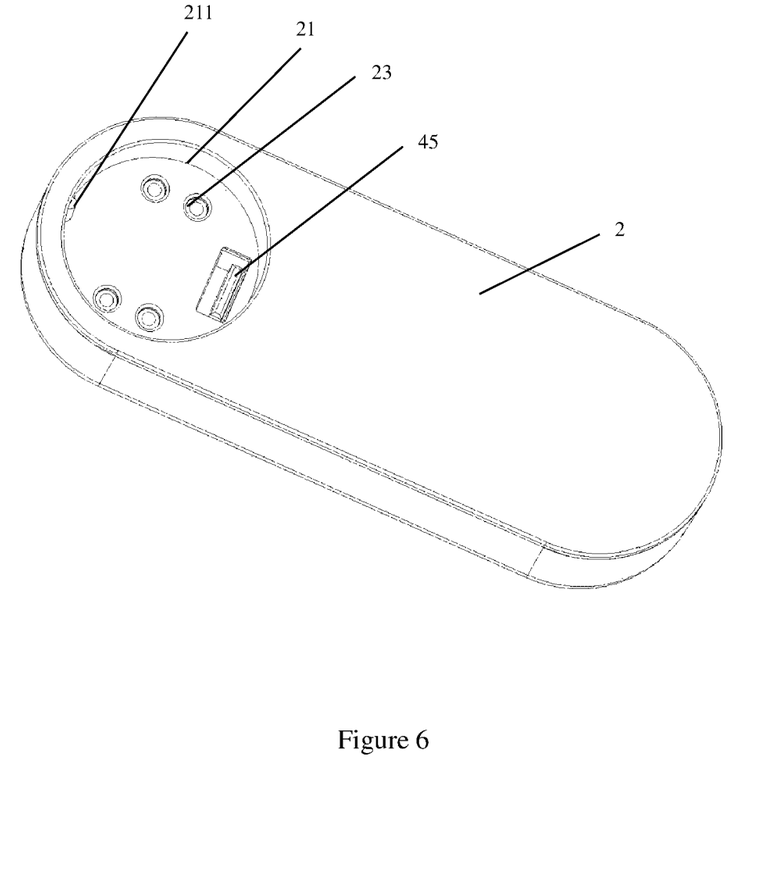
FIG. 6 is a schematic view showing a handle of the wireless handheld device according to the first embodiment of the present invention.

FIG. 6 is a schematic view showing a handle of the wireless handheld device according to the first embodiment of the present invention.

Figure 7:
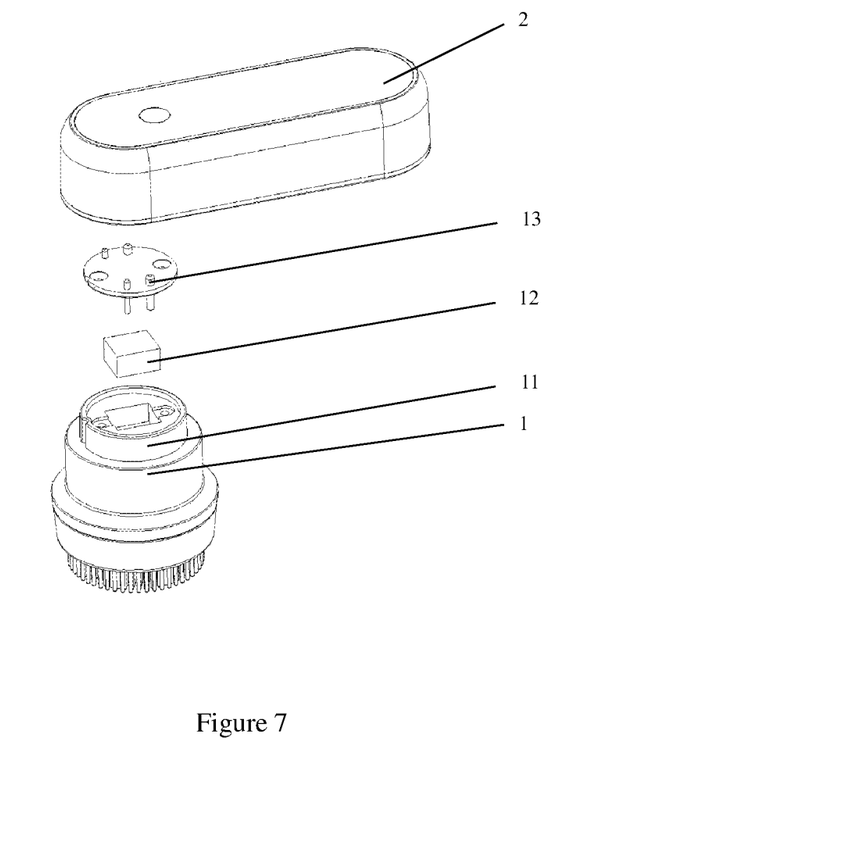
FIG. 7 is a schematic view showing an electric hairbrush of the wireless handheld device according to the first embodiment of the present invention.

FIG. 7 is a schematic view showing an electric hairbrush of the wireless handheld device according to the first embodiment of the present invention.

Figure 8:
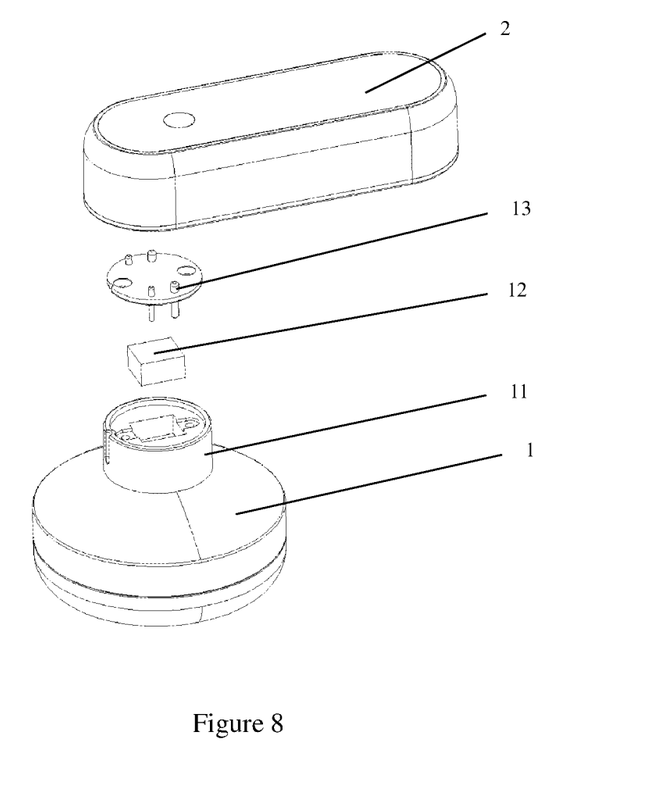
FIG. 8 is a schematic view showing a lint ball trimmer of the wireless handheld device according to the first embodiment of the present invention.

FIG. 8 is a schematic view showing a lint ball trimmer of the wireless handheld device according to the first embodiment of the present invention.

With reference to FIGS. 1 to 8, a wireless handheld device according to the first embodiment is shown which comprises a device structure 1 and a handle 2, wherein the device structure 1 is detachably connected to the handle 2 by a magnetic type structure; a lithium battery is disposed in the handle 2; and a driving mechanism is disposed in the device structure 1.

Furthermore, in a preferred embodiment, the magnetic type structure comprises a slot 21 and a connector 11, wherein the slot 21 is fitted with the connector 11; the slot 21 is arranged on a lower surface of the handle 2; the connector 11 is arranged on an upper surface of the device structure 1; a first magnetic structure 22 is disposed in the slot 21; a second magnetic structure 12 is disposed in the connector 11; and the first magnetic structure 22 matches with the second magnetic structure 12.

Preferably, both the first magnetic structure 22 and the second magnetic structure 12 are iron sheets, or the first magnetic structure 22 is an iron sheet and the second magnetic structure 12 is a magnet, or both the first magnetic structure 22 and the second magnetic structure 12 are magnets. The first magnetic structure 22 and the second magnetic structure 12 provide a detachable connection which is achieved by magnetic attraction, so as to facilitate the disassembly and storage of wireless iron devices. Preferably, the magnet and the iron sheet are of rectangular shapes for alignment of magnetic attraction.

Furthermore, in a preferred embodiment, the magnetic type structure further comprises a plurality of first contacts 13 and a plurality of second contacts 23, wherein each of the plurality of first contacts 13 matches with each of the plurality of second contacts 23; the plurality of first contacts 13 are electrically connected to the driving mechanism and the plurality of second contacts 23 are electrically connected to the lithium battery; and each of the plurality of first contacts 13 is detachably electrically connected to each of the plurality of second contacts 23. The plurality of first contacts 13 and the plurality of second contacts 23 provide means for connection of circuit, allowing the ceramic heating piece 33 to be electrically conducted via the first contacts to enter the operating state. Preferably, the number of the plurality of first contacts is 4.

Furthermore, in a preferred embodiment, the device structure 1 is an electric iron, and the driving mechanism is a heating structure.

Furthermore, in a preferred embodiment, the heating structure comprises, as fixably disposed parts in a sequence from top to bottom, a top cover 30, a middle cover 31, a pressing plate 32, a ceramic heating piece 33, and a bottom plate 34, wherein the top cover 30 is of a conical shape; an upper end of the top cover 30 extends upward to form the connector 11; a periphery of the pressing plate 32 is fixedly connected to the bottom plate 34; a lower surface of the pressing plate 32 rests against the ceramic heating piece 33; and a lower surface of the ceramic heating piece 33 rests against the bottom plate 34. A lower surface of the bottom plate 34 is of a teardrop shape. A periphery of the teardrop-shaped structure of the bottom plate 34 comprises a sharp-angled portion on the left side of FIG. 3 and a circular arc portion on the right side of FIG. 3, wherein the sharp-angled portion is particularly suitable for ironing some clothes, such as shirts and trousers having folds.

Furthermore, in a preferred embodiment, the bottom plate 34 is provided with a bottom plate groove, and both the ceramic heating piece 33 and the pressing plate 34 are disposed in the bottom plate groove.

The above descriptions are only the preferred embodiments of the invention, not thus limiting the embodiments and scope of the invention.

Based on the forgoing description, a further embodiment of the present invention is described as follows:

In a further embodiment of the present invention, an upper surface of the middle cover 31 is further provided with a plurality of fins 311, and the plurality of fins 311 are arranged in a circumferential array.

In a further embodiment of the present invention, the device structure 1 may be an electric lint ball trimmer shown in FIG. 8 or an electric hairbrush shown in FIG. 7. The electric iron, the electric lint ball trimmer or the electric hairbrush may be connected with or detached from the handle 2 by a quick rotation, insertion or disconnection for switching functions as desired.

In a further embodiment of the present invention, the handle 2 comprises an upper shell 40 and a lower shell 41, wherein the upper shell 40 is fixedly connected to the lower shell 41; an electronic board 42 is arranged inside the upper shell 40 and the lower shell 41; the plurality of second contacts 23, a display screen 43 and the lithium battery are disposed on the electronic board 42; one side of a lower surface of the lower shell 41 is provided with a slot 21 in which the plurality of second contacts 23 are located.

In a further embodiment of the present invention, the electronic board 42 is further provided with a charging interface 44 and a USB output interface 45. The presence of the USB output interface 45 makes it possible for the handle 2 to serve as power bank (i.e., a portable charger) when it is not used with the heating structure.

In a further embodiment of the present invention, side walls of the slot 21 have a plurality of positioning ribs, side surfaces of the connector 11 have a plurality of positioning grooves 111, and each of the positioning ribs 211 is fitted with each of the positioning grooves 111.

In a further embodiment of the present invention, the plurality of positioning grooves 111 extend from an upper end of the connector 11 to a middle portion of the connector 11.

In a further embodiment of the present invention, further comprising: a bottom plate sleeve 5 having a teardrop shape fitted to the shape of the bottom plate 34. The bottom plate sleeve 5 is made of high-temperature resistant silicone material. When the device is stored, the bottom plate sleeve 5 functions as a storage component for the bottom plate 34. Referring to FIG. 5, when in regular use, the bottom plate sleeve 5 functions as an iron stand for shelving the iron in the case of the non-use of the iron, such that a tabletop or the clothes may not be burnt and damaged.

Example 2

Figure 9:
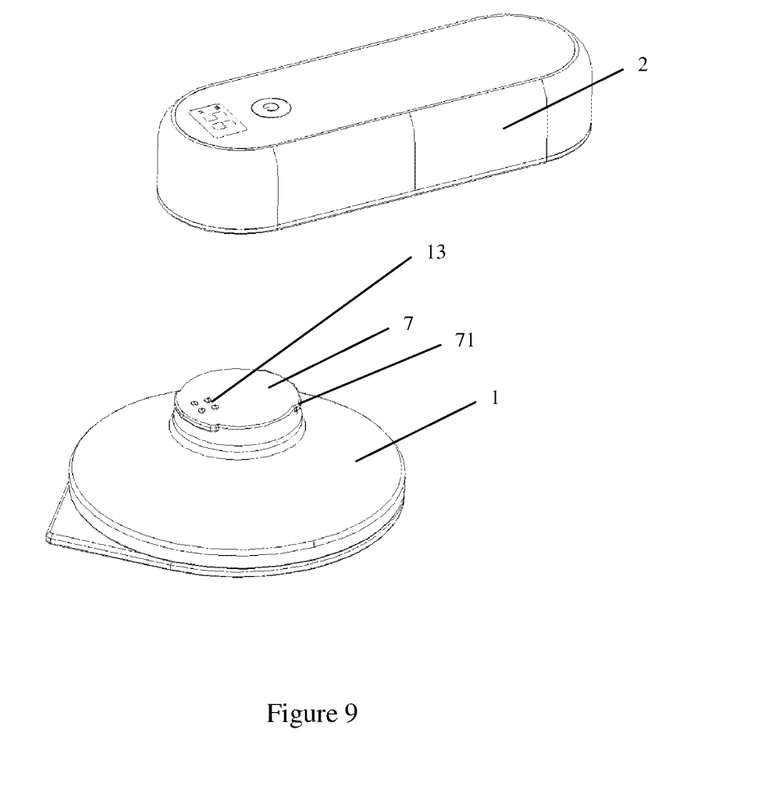
FIG. 9 is a schematic exploded view showing a wireless handheld device according to a second embodiment of the present invention.
Figure 10:
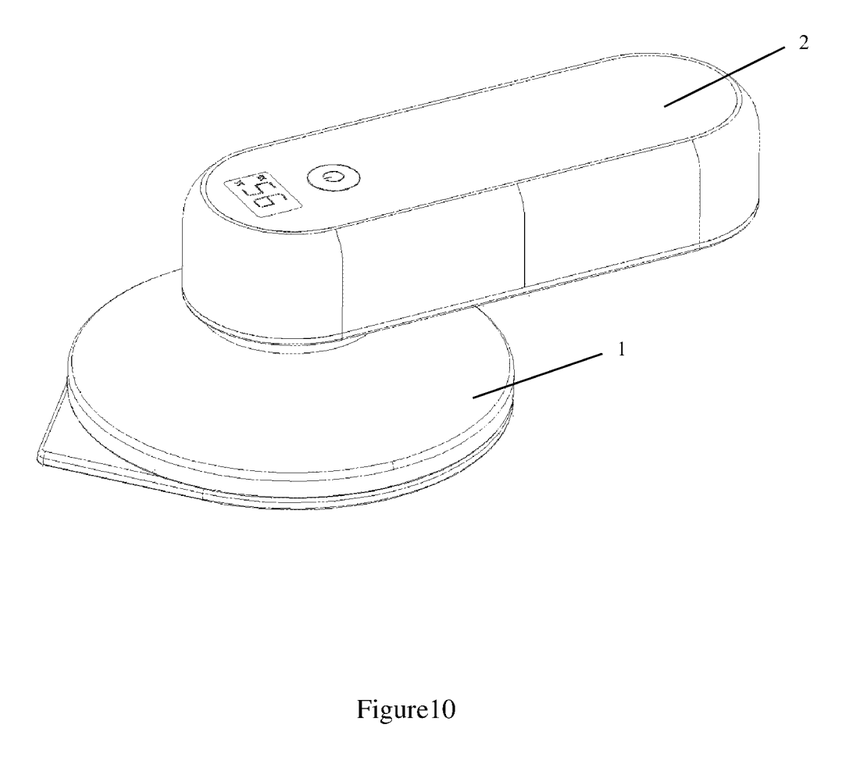
FIG. 10 is a schematic view showing the wireless handheld device according to the second embodiment of the present invention.
Figure 11:
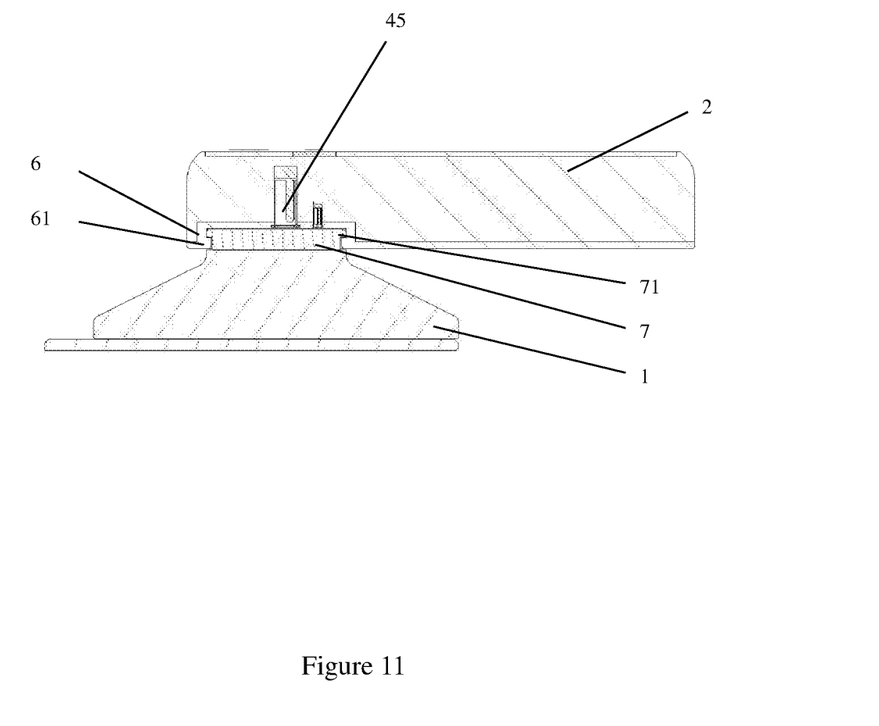
FIG. 11 is a sectional view showing the wireless handheld device according to the second embodiment of the present invention.

FIG. 9 is a schematic exploded view showing a wireless handheld device according to a second embodiment of the present invention. FIG. 10 is a schematic view showing the wireless handheld device according to the second embodiment of the present invention. FIG. 11 is a sectional view showing the wireless handheld device according to the second embodiment of the present invention. With reference to FIGS. 9 to 11, a wireless handheld device according to the second embodiment is shown which is similar to the wireless handheld device in the first embodiment. The difference between the second embodiment and the first embodiment is that, it comprises a device structure 1 and a handle 2, wherein the device structure 1 is detachably connected to the handle 2 by a clamping type structure; a lithium battery is disposed in the handle 2; and a driving mechanism is disposed in the device structure 1.

Furthermore, in a preferred embodiment, the clamping type structure comprises a slot 6 and a connector 7, wherein the slot 6 is fitted with the connector 7; the slot 6 is arranged on a lower surface of the handle 2; the connector 7 is arranged on an upper surface of the device structure 1; a lower end of the slot 6 extends inward to form a first clamping block 61, an upper end of the connector 7 extends outward to form a second clamping block 71; the slot 6 and the connector 7 are rotated and connected by the first clamping block 61 and the second clamping block 71. The device structure 1 is rotated in one direction such that the second clamping block 71 is positioned in a gap between two first clamping blocks 61, and the connector 7 is then inserted into the slot 6; afterwards, the device structure 1 is rotated in an opposite direction such that the second clamping block 71 is positioned above the first clamping block 61. Thus, the device structure 1 is fixedly connected with the handle 2.

Furthermore, in a preferred embodiment, the clamping type structure further comprises a plurality of first contacts 13 and a plurality of second contacts 23, wherein each of the plurality of first contacts 13 matches with each of the plurality of second contacts 23; the plurality of first contacts 13 are electrically connected to the driving mechanism and the plurality of second contacts 23 are electrically connected to the lithium battery; and each of the plurality of first contacts 13 is detachably electrically connected to each of the plurality of second contacts 23.

The above descriptions are only the preferred embodiments of the invention, not thus limiting the embodiments and scope of the invention. Those skilled in the art should be able to realize that the schemes obtained from the content of specification and drawings of the invention are within the scope of the invention.

What is claimed is:

1. A wireless handheld device, comprising:
a device structure and a handle, the device structure being detachably connected to the handle by a magnetic type structure, a lithium battery being disposed in the handle, a driving mechanism being disposed in the device structure;
wherein the magnetic type structure comprises a slot and a connector, the slot is fitted with the connector, the slot is arranged on a lower surface of the handle, the connector is arranged on an upper surface of the device structure, wherein, a first magnetic structure is disposed in the slot, a second magnetic structure is disposed in the connector, and the first magnetic structure matches with the second magnetic structure;
the magnetic type structure further comprises a plurality of first contacts and a plurality of second contacts, wherein each of the plurality of first contacts matches with each of the plurality of second contacts, the plurality of first contacts are electrically connected to the driving mechanism and the plurality of second contacts are electrically connected to the lithium battery, and each of the plurality of first contacts is detachably electrically connected to each of the plurality of second contacts;
wherein the driving mechanism is a heating structure;
wherein the heating structure comprises, as fixably disposed parts in a sequence from top to bottom, a top cover, a middle cover, a pressing plate, a ceramic heating piece, and a bottom plate, wherein the top cover is of a conical shape; an upper end of the top cover extends upward to form the connector; a periphery of the pressing plate is fixedly connected to the bottom plate; a lower surface of the pressing plate rests against the ceramic heating piece; and a lower surface of the ceramic heating piece rests against the bottom plate; and
wherein the bottom plate is provided with a bottom plate groove, and both the ceramic heating piece and the pressing plate are disposed in the bottom plate groove.

2. The wireless handheld device of claim 1, wherein the device structure is an electric iron.

3. The wireless handheld device of claim 2, further comprising: a bottom plate sleeve having a teardrop shape fitted to the shape of the bottom plate.

4. The wireless handheld device of claim 1, wherein an upper surface of the middle cover is further provided with a plurality of fins, and the plurality of fins are arranged in a circumferential array.

5. The wireless handheld device of claim 1, wherein the device structure is an electric lint ball trimmer or an electric hair brush.

6. The wireless handheld device of claim 1, wherein the handle comprises an upper shell and a lower shell, wherein the upper shell is fixedly connected to the lower shell; an electronic board is arranged inside the upper shell and the lower shell; the plurality of second contacts, a display screen and the lithium battery are disposed on the electronic board; one side of a lower surface of the lower shell is provided with a slot in which the plurality of second contacts are located.

7. The wireless handheld device of claim 6, wherein the electronic board is further provided with a charging interface and a USB output interface.

8. The wireless handheld device of claim 1, wherein side walls of the slot have a plurality of positioning ribs, side surfaces of the connector have a plurality of positioning grooves, and each of the plurality of positioning ribs is fitted with each of the plurality of positioning grooves.

9. The wireless handheld device of claim 8, wherein the plurality of positioning grooves extend from an upper end of the connector to a middle portion of the connector.

10. A wireless handheld device, comprising:
a device structure and a handle, the device structure being detachably connected to the handle by a magnetic type structure, a lithium battery being disposed in the handle, a driving mechanism being disposed in the device structure;
wherein the magnetic type structure comprises a slot and a connector, the slot is fitted with the connector, the slot is arranged on a lower surface of the handle, the connector is arranged on an upper surface of the device structure, wherein a first magnetic structure is disposed in the slot, a second magnetic structure is disposed in the connector, and the first magnetic structure matches with the second magnetic structure;
the magnetic type structure further comprises a plurality of first contacts and a plurality of second contacts, wherein each of the plurality of first contacts matches with each of the plurality of second contacts, the plurality of first contacts are electrically connected to the driving mechanism and the plurality of second contacts are electrically connected to the lithium battery, and each of the plurality of first contacts is detachably electrically connected to each of the plurality of second contacts; and
wherein the handle comprises an upper shell and a lower shell, wherein the upper shell is fixedly connected to the lower shell; an electronic board is arranged inside the upper shell and the lower shell; the plurality of second contacts, a display screen and the lithium battery are disposed on the electronic board; one side of a lower surface of the lower shell is provided with a slot in which the plurality of second contacts are located.

* * * * *